US012780747B2

(12) United States Patent
Taggart

(10) Patent No.: US 12,780,747 B2
(45) Date of Patent: Nov. 3, 2026

(54) CARBON-CARBON COMPOSITES AND RELATED METHODS OF FABRICATING THREE-DIMENSIONAL CARBON-CARBON COMPOSITES USING CLOSED TOOL MULTIPLE INFUSION RESIN TRANSFER MOLDING PROCESSES

(71) Applicant: Albany Engineered Composites, Inc., Rochester, NH (US)

(72) Inventor: James Taggart, Bath, ME (US)

(73) Assignee: Albany Engineered Composites, Inc., Rochester, NH (US)

( * ) Notice: Subject to any disclaimer, the term of this patent is extended or adjusted under 35 U.S.C. 154(b) by 115 days.

(21) Appl. No.: 18/417,240

(22) Filed: Jan. 19, 2024

(65) Prior Publication Data

US 2024/0246867 A1 Jul. 25, 2024

Related U.S. Application Data

(60) Provisional application No. 63/440,499, filed on Jan. 23, 2023.

(51) Int. Cl.
*B29C 64/00* (2017.01)
*C04B 35/83* (2006.01)
*C04B 41/50* (2006.01)

(52) U.S. Cl.
CPC .......... *C04B 35/83* (2013.01); *C04B 41/5001* (2013.01); *C04B 2235/5248* (2013.01)

(58) Field of Classification Search
CPC ............................ C04B 35/83; C04B 41/5001
See application file for complete search history.

(56) References Cited

U.S. PATENT DOCUMENTS 5,616,175 A 4/1997 Walsh
6,325,608 B1 12/2001 Shivakumar et al.
(Continued)

FOREIGN PATENT DOCUMENTS

CN 101391893 A * 3/2009
JP H 02-283666 A 11/1990
(Continued)

OTHER PUBLICATIONS

Boussu, François, et al.: "Mouldability of Angle Interlock Fabrics", FPCM-9 (2008), The 9th International Conference on Flow Processes in Composite Materials, Montreal, Quebec, Canada, Jul. 8-10, 2008, pp. 1-9.
(Continued)

*Primary Examiner* — Nicholas Krasnow
(74) *Attorney, Agent, or Firm* — McCarter & English, LLP

(57) ABSTRACT

The invention relates to three-dimensional carbon-carbon composites for use in high temperature applications, such as aerospace structures. The invention further relates to methods and related compositions for making a three-dimensional carbon-carbon composite. In certain embodiments, the invention provides a method to densify geometrically complex three-dimensional woven carbon fiber preforms into high density carbon-carbon composites at faster rates and lower cost than traditional processing approaches using, e.g., multiple resin transfer moldings (RTM) of a three-dimensional woven preform, or of a partially dense carbon-carbon intermediate, in a closed tool volume using high pressure piston injectors, followed by carbonization and graphitization of the resulting composite.

19 Claims, 4 Drawing Sheets

(56) References Cited

U.S. PATENT DOCUMENTS

| | | | | |
|---|---|---|---|---|
| 6,706,401 | B1 | 3/2004 | Wapner et al. | |
| 7,172,408 | B2 | 2/2007 | Wood et al. | |
| 7,332,112 | B1 | 2/2008 | Shivakumar et al. | |
| 7,700,014 | B2 | 4/2010 | Simpson et al. | |
| 7,897,072 | B2 | 3/2011 | La Forest et al. | |
| 7,998,376 | B2 | 8/2011 | La Forest et al. | |
| 8,003,026 | B2 | 8/2011 | La Forest et al. | |
| 8,268,207 | B2 | 9/2012 | La Forest et al. | |
| 8,454,867 | B2 | 6/2013 | La Forest et al. | |
| 8,721,954 | B2 | 5/2014 | La Forest et al. | |
| 9,127,732 | B2 | 9/2015 | La Forest et al. | |
| 2003/0111752 | A1 | 6/2003 | Wood et al. | |
| 2004/0113302 | A1* | 6/2004 | La Forest | C04B 35/83 264/510 |
| 2010/0136292 | A1* | 6/2010 | Lucas | B32B 3/10 428/156 |
| 2013/0231024 | A1* | 9/2013 | Lecostaouec | D03D 49/20 442/212 |
| 2015/0128828 | A1 | 5/2015 | La Forest et al. | |
| 2017/0267594 | A1* | 9/2017 | Le Costaouec | C04B 35/521 |
| 2018/0328429 | A1 | 11/2018 | Fryska et al. | |

FOREIGN PATENT DOCUMENTS

| | | |
|---|---|---|
| JP | H 03-271163 A | 12/1991 |
| JP | 2002-003280 A | 1/2002 |

OTHER PUBLICATIONS

Li, Weixin et al.: "Elastic and fracture behavior of three-dimensional ply-to-ply angle interlock woven composites: Through-thickness, size effect, and multiaxial tests", Composites Part C: Open Access, 4, 2021, 100098, pp. 1-25.

Olliges, Ryan: "Carbon Fiber Weaves: What they are and why to use them", Elevated Materials, Jan. 17, 2019, see https://www.elevatedmaterials.com/carbon-fiber-weaves-what-they-are-and-why-to-use-them/, accessed Jan. 25, 2024.

International Search Report and Written Opinion, prepared by the European Patent Office, acting as the International Searching Authority, for International Application PCT/US2024/012149, mailed Jun. 3, 2024.

"How Strong Is Carbon Fiber? Tensile Strength, Weight, and How It Stacks up Against Steel"; https://carbonfibergear.com/blogs/carbonfiber/how-strong-is-carbon-fiber?srsltid=AfmBOopKLW3QNxLOIugTW3gibbgN2UGzX3zpwDX7Oy704mjeiWx15IxM); accessed Jan. 22, 2026.

"Carbon Fiber 101: Standard Modulus, Intermediate Modulus, High Modulus, and Ultra High Modulus"; https://dragonplate.com/carbon-fiber-101-standard-modulus-intermediate-modulus-high-modulus-and-ultra-high-modulus?srsltid=AfmBOorkzeVDvusevuj_119M47S6Z7SVvCvvQk5aYM_lzNfsYUR3QnGY); Jan. 28, 2021; accessed Jan. 22, 2026.

* cited by examiner

CARBON-CARBON COMPOSITES AND RELATED METHODS OF FABRICATING THREE-DIMENSIONAL CARBON-CARBON COMPOSITES USING CLOSED TOOL MULTIPLE INFUSION RESIN TRANSFER MOLDING PROCESSES

CROSS-REFERENCE TO RELATED APPLICATION

This application claims the benefit of priority under 35 U.S.C. § 119 of U.S. Provisional Patent Application Ser. No. 63/440,499, filed Jan. 23, 2023. The foregoing application is incorporated herein by reference in its entirety.

FIELD OF THE INVENTION

The invention relates to three-dimensional carbon-carbon composites for use in high temperature applications, such as aerospace structures. The invention further relates to methods and related compositions for making a three-dimensional carbon-carbon composite.

BACKGROUND

Two historical fabrication processes are commonly used to make carbon-carbon composites. These two historical fabrication processes are (i) liquid matrix approaches that can be further classified into (a) use of a prepreg process or (b) a polymer infiltration and pyrolysis (PIP) process and (ii) chemical vapor infiltration (CVI).

The liquid matrix approach with a prepreg process generally entails using a resin infused carbon fabric, or prepreg. In this method, a two-dimensional (2D) carbon fabric is prepregged with a high char yield resin and processed into a carbon-carbon composite. A high char yield matrix material (often phenolic resin) is used to provide a carbon matrix. Two-dimensional woven carbon fabric, either polyacrylonitrile or coal tar or petroleum pitch based, is the most common fiber reinforcement. The fabric is then run through a bath of resin followed by nip rollers to press the resin into the fabric and remove excess resin. The impregnated fabric is then B-staged (that is, partially cured yet retaining some flow characteristics) and re-rolled.

Once the fabric prepregging process is completed, the resin coated fiber is cut from the fabric into plies, specific to the composite design. These resin coated fiber plies are then laid up (or oriented) into the specific orientation (0, 90 degrees or 0, 45, 90, −45, 0 degrees, or any combination thereof) of the composite structure. The designed composite structure can be flat (such as panels) or have a limited degree of complexity (such as curvatures). By contrast, geometrically complex shapes are difficult to manufacture in this manner because undesirable traits such as wrinkles, pinching, etc., form as the fabric is draped over a complex shape.

After the ply layup is completed, the resin-fiber structure is then loaded into an autoclave for vacuum and pressure curing. After curing, the structure is placed between two graphite plates or into graphite tooling, e.g., a graphite mold, to ensure dimensional conformity during the resin's conversion to carbon in the steps of carbonization (generally, a process in which an organic material is converted to carbon, usually by pyrolysis in an inert atmosphere) and graphitization (generally, heating non-graphitic carbon for certain periods of time to achieve transformation into graphitic carbon). After graphitization, additional densification may or may not (depending on the application, or use, of the composite) be performed to achieve higher density and potentially higher thermal and mechanical composite properties. For example, a polymer infiltration and pyrolysis (PIP) processing approach can be employed whereby, e.g., in two-dimensional densification, after the prepreg is laid up and cured, carbonized, and graphitized, PIP or similar processing is employed.

One significant disadvantage of the liquid matrix prepreg process for a two-dimensional structure is the application of this process to a three-dimensional preform. For example, when applying a two-dimensional prepreg approach to a three-dimensional preform, the matrix does not infiltrate the relatively thick three-dimensional carbon fiber preform during the prepreg fabrication process. Because the matrix does not infiltrate, the resulting carbon-carbon composite will have lower performance capabilities, such as lower thermal and/or mechanical properties.

In some instances, rather than the foregoing two-dimensional prepreg process, preform processing with three-dimensional (3D) and four-dimensional (4D) architectures using a polymer infiltration and pyrolysis (PIP) approach is used. In this conventional approach, where a two-dimensional prepreg fabric is not used, the fabric or preform is processed into a carbon-carbon composite from an initial dry state. Hand or machine woven dry preforms, such as three-dimensional or four-dimensional carbon preforms, are infiltrated via polymer infiltration processing. In these cases, the dry fiber layup, or preform, is tooled in graphite tooling. That is, the multi-dimensional three-dimensional or four-dimensional woven carbon fiber preform is inserted into a graphite tool to maintain dimensional stability, and placed in a container that is in a vacuum chamber. A vacuum is established and a high char yield resin matrix is introduced into the chamber until the fiber preform is completely submerged in the liquid resin. The liquid resin then infiltrates into the fiber preform. At this point, the vacuum is relieved to atmospheric pressure. The resin filled fiber preform can then be removed from the container and cured. Another option is to cure the resin filled preform while it is still submerged and then machine off the excess cured resin in an intermediate processing step.

To convert the resin to carbon, the resin-fiber structure encased in the graphite plates or graphite tools is then loaded into a furnace capable of temperatures up to 1200° C. in inert atmosphere (nitrogen or argon is typically used). The furnace is then run and the resin is converted into a carbon char. The furnace is then cooled and the intermediate structure and graphite tooling is then removed from the furnace. The intermediate structure in graphite tooling is then placed in a graphitizing furnace capable of temperatures from 1600° C. to 2400° C. The furnace is then run and the resin is converted into a more graphitic carbon char. The furnace is then cooled and the intermediate composite and graphite tooling is then removed from the furnace. The intermediate composite is then removed from the graphite tooling.

The intermediate composite, though carbonized and graphitized and technically a carbon-carbon composite, has relatively high porosity (low density) and thus low thermal and mechanical properties. This porosity is due to the resin char conversion. When the resin undergoes thermal decomposition and forms a carbon char, approximately 50% to 70% of the initial resin weight is remaining. The other 50% to 30% is volatile organic compounds (VOCs) and leaves the intermediate structure and is vented out the furnace. The most common VOCs for this process are aromatic structures such as benzene, methane, carbon dioxide, and hydrogen. The loss of the VOCs due to the decomposition is what creates the high porosity (low density) and depending on the target application, or use, for the carbon-carbon composite, likely will require additional processing to reach the desired thermal and mechanical targets for applications such as, e.g., aeronautical applications.

Accordingly, though the PIP process can be done with relatively low equipment costs, several disadvantages exist. For example, there is a tendency of the matrix, especially in later infiltration cycles, to not fully infiltrate the center of the carbon-carbon intermediate composites, thereby creating density gradients, and thus lowering composite performance. Although intermediate machining steps could be performed to improve the resin matrix flow into the composite's closed porosity for two-dimensional structures, this is not an option for three-dimensional woven preforms of the PIP process as machining would cause damage to the through-thickness fibers of the three-dimensional architecture, resulting in, e.g., lower interlaminar properties.

Another conventional carbon-carbon composite fabrication approach is chemical vapor infiltration (CVI). CVI has been demonstrated with three-dimensional structures, and though the composite mechanical properties are generally sufficient, it is a very time consuming, e.g., spanning about 5-8 months, and expensive process with very significant capital equipment costs. The CVI capital equipment is very complicated and expensive, thus limiting the number of commercial vendors and scalability to industrial scale.

The CVI process generally entails an approach whereby a two-dimensional, three-dimensional, or four-dimensional preform is loaded into a CVI reactor. The reactor is a furnace that operates typically in the 1200° C. to 1800° C. range under vacuum conditions. Pyrolytic carbon precursors in the gas/vapor phase are then introduced in a very controlled method into the reactor where they are thermally decomposed. The decomposition results in atomized carbon, which deposits in and on the carbon preform structure. The secondary product is hydrogen, which is vented out of the furnace. As the process runs, the atomized carbon fills in the intermediate composite's porosity to achieve density. To achieve high density (nominally 1.5 gm/cc to over 2.0 gm/cc for most commercial applications), multiple CVI cycles are required. The number of cycles is often from three to ten cycles depending on the composite complexity, fiber architecture, carbon gains, carbon precursor gas flows, temperatures, pressures, and/or vacuum levels, etc.

SUMMARY OF THE INVENTION

The instant invention relates to methods of making a carbon-carbon composite. A method of the instant invention includes (a) impregnating a woven three-dimensional carbon fiber preform with a high char yield resin, (b) curing the high char yield resin, thereby creating a three-dimensional polymer matrix composite, (c) carbonizing the three-dimensional polymer matrix composite, thereby creating an intermediate carbon-carbon composite, (d) graphitizing the intermediate carbon-carbon composite, (e) impregnating the intermediate carbon-carbon composite with a high char yield resin and curing the high char yield resin, (f) carbonizing the intermediate carbon-carbon composite of (e), and graphitizing the intermediate carbon-carbon composite of (f).

In certain embodiments, the method includes repeating (e) impregnating the intermediate carbon-carbon composite with a high char yield resin and curing the high char yield resin, (f) carbonizing the intermediate carbon-carbon composite of (e), and (g) graphitizing the intermediate carbon-carbon composite of (f) until a desired carbon-carbon composite density is achieved.

In some embodiments, the woven three-dimensional carbon fiber preform is heat treated and stabilized prior to impregnating the woven three-dimensional carbon fiber preform with a high char yield resin. In certain embodiments, the woven three-dimensional carbon fiber preform is heat treated and stabilized in a graphite tool. In further embodiments, the graphite tool and woven three-dimensional carbon fiber preform are heated to 4000-5000° F. in a partial vacuum or inert atmosphere.

In certain embodiments, the woven three-dimensional carbon fiber preform is jacquard woven.

In some embodiments, the woven three-dimensional carbon fiber preform has a fiber type selected from the group consisting of: high strength carbon fibers, intermediate modulus carbon fibers, high modulus carbon fibers, and combinations thereof.

In other embodiments, the woven three-dimensional carbon fiber preform has a carbon fiber size selected from the group consisting of: 3K, 6K, 12K, 24K, and 48K.

In some embodiments, the woven three-dimensional carbon fiber preform has a three-dimensional fiber architecture selected from the group consisting of: ply to ply interlock, angle interlock, orthogonal interlock, and combinations thereof.

In certain embodiments, the woven three-dimensional carbon fiber preform has a carbon fiber volume fraction between 50%-75%.

In other embodiments, the three-dimensional carbon fiber preform is a flat panel or a geometrically complex shape.

In certain embodiments, the graphite tool has a shape selected from the group consisting of: a male section, a female section, a male and female section, a segment, an insert, and combinations thereof.

In other embodiments, the woven three-dimensional carbon fiber preform is near net shaped.

In yet other embodiments, impregnation with the high char yield resin in the methods of the invention occurs in a resin transfer molding tool. In some embodiments, the resin transfer molding tool has a shape selected from the group consisting of: a male section, a female section, a male and female section, a segment, an insert, and combinations thereof. In certain embodiments, the resin transfer molding tool is steel or aluminum.

In yet other embodiments, an inner tool cavity of the resin transfer molding tool for impregnating a woven three-dimensional carbon fiber preform with a high char yield resin is coated with a release film between 0.001 inches to 0.010 inches thick and rated for a 500° F. operating temperature with a peel strength of 22 Newtons/5 cm.

In some embodiments, an inner tool cavity of the resin transfer molding tool for impregnating the intermediate carbon-carbon composite with a high char yield resin and curing the high char yield resin is coated with an organic liquid release coat.

In yet other embodiments, the resin transfer molding tool is loaded into a hydraulic press. In certain embodiments, the hydraulic press is operable between 50 and 1000 tons of pressure at a temperature up to 850° F.

In some embodiments, a piston injector containing the high char yield resin is operably connected to a resin inlet port on the resin transfer molding tool. In certain embodiments, the piston injector is capable of exerting a pressure between 0 psi to 1000 psi at a temperature up to 700° F.

In some embodiments, the resin has an 800° C. thermogravimetric analysis (TGA) char yield between 50-75%. In certain embodiments, the high char yield resin is selected from phenolic resins, cyanate ester resins, phthalonitrile resins, and benzoxazine resins.

In some embodiments, the high char yield resin is heated such that the resin has a viscosity between 48 cps and 1,000 cps.

In other embodiments, an activation pressure for the piston injector is exerted between 250 psi and 750 psi such that the resin fills an inner cavity of the resin transfer molding tool.

In some embodiments, the carbonizing occurs in a carbonizing furnace capable of temperatures between 800° C. and 1200° C. and having an inert gas atmosphere. In certain embodiments, the inert gas is nitrogen or argon.

In some other embodiments, the graphitizing occurs in a graphitizing furnace capable of temperatures between 1500° C. and 2500° C. and having a negative pressure atmosphere.

In yet other embodiments, the carbonization and graphitization of the three-dimensional polymer matrix composite and intermediate carbon-carbon composite occur in a graphite tool.

The invention further relates to a carbon-carbon composite produced by a method including (a) impregnating a woven three-dimensional carbon fiber preform with a high char yield resin, (b) curing the high char yield resin, thereby creating a three-dimensional polymer matrix composite, (c) carbonizing the three-dimensional polymer matrix composite, thereby creating an intermediate carbon-carbon composite, (d) graphitizing the intermediate carbon-carbon composite, (e) impregnating the intermediate carbon-carbon composite with a high char yield resin and curing the high char yield resin, (f) carbonizing the intermediate carbon-carbon composite of (e), and (g) graphitizing the intermediate carbon-carbon composite of (f). In certain embodiments, the method includes repeating (e) impregnating the intermediate carbon-carbon composite with a high char yield resin and curing the high char yield resin, (f) carbonizing the intermediate carbon-carbon composite of (e), and (g) graphitizing the intermediate carbon-carbon composite of (f) until a desired carbon-carbon composite density is achieved.

In certain embodiments, the carbon-carbon composite density is between 1.5 gm/cc-2.0 gm/cc. In further embodiments, the carbon-carbon composite density is between 1.70 gm/cc to 2.0 gm/cc. In other embodiments, the carbon-carbon composite density is greater than 2.0 gm/cc.

In some embodiments, the carbon-carbon composite is a component in an aeronautical product, an aerospace product, and/or an automotive product.

The invention also relates to a carbon-carbon composite that is a carbonized and graphitized three-dimensional polymeric matrix composite, wherein the three-dimensional polymeric matrix composite has a woven three-dimensional carbon fiber preform impregnated with a high char yield resin. In some embodiments, the woven three-dimensional carbon fiber preform is fully impregnated with the high char yield resin. In certain embodiments, the carbon-carbon composite density is between 1.5 gm/cc-2.0 gm/cc. In further embodiments, the carbon-carbon composite density is between 1.70 gm/cc to 2.0 gm/cc. In other embodiments, the carbon-carbon composite density is greater than 2.0 gm/cc.

In some embodiments, the carbon-carbon composite is a component in an aeronautical product, an aerospace product, and/or an automotive product. In certain embodiments, the carbon-carbon composite has high interlaminar performance.

In certain embodiments, the woven three-dimensional carbon fiber preform has a fiber type selected from the group consisting of: high strength carbon fibers, intermediate modulus carbon fibers, high modulus carbon fibers, and combinations thereof.

In other embodiments, the woven three-dimensional carbon fiber preform has a carbon fiber size of 3K, 6K, 12K, 24K, and/or 48K.

In yet other embodiments, the woven three-dimensional carbon fiber preform is a flat panel or a geometrically complex shape.

In certain embodiments, the woven three-dimensional carbon fiber preform has a three-dimensional fiber architecture selected from the group consisting of: ply to ply interlock, angle interlock, orthogonal interlock, and combinations thereof.

In some embodiments, the high char yield resin is selected from phenolic resins, cyanate ester resins, phthalonitrile resins, and benzoxazine resins.

The invention further relates to an apparatus for forming a carbon-carbon composite. In certain embodiments, the apparatus has (a) a station for impregnating a woven three-dimensional carbon fiber preform with a high char yield resin and for curing the high char yield resin to create a three-dimensional polymer matrix composite, (b) a carbonization station for carbonizing the three-dimensional polymer matrix composite to create an intermediate carbon-carbon composite, (c) a graphitization station for graphitizing the intermediate carbon-carbon composite, (d) a station for impregnating the intermediate carbon-carbon composite with a high char yield resin and for curing the high char yield resin, (e) a carbonization station for carbonizing the intermediate carbon-carbon composite of (d), and (f) a graphitization station for graphitizing the intermediate carbon-carbon composite of (e).

In certain embodiments, the resin impregnating stations of (a) and (d) of the apparatus comprise a resin transfer molding tool. In other embodiments, the resin impregnating stations of (a) and (d) comprise a hydraulic press. In yet other embodiments, the resin impregnating stations of (a) and (d) comprise a piston injector operably connected to a resin inlet port on the resin transfer molding tool.

DETAILED DESCRIPTION OF THE INVENTION

Figure 1:
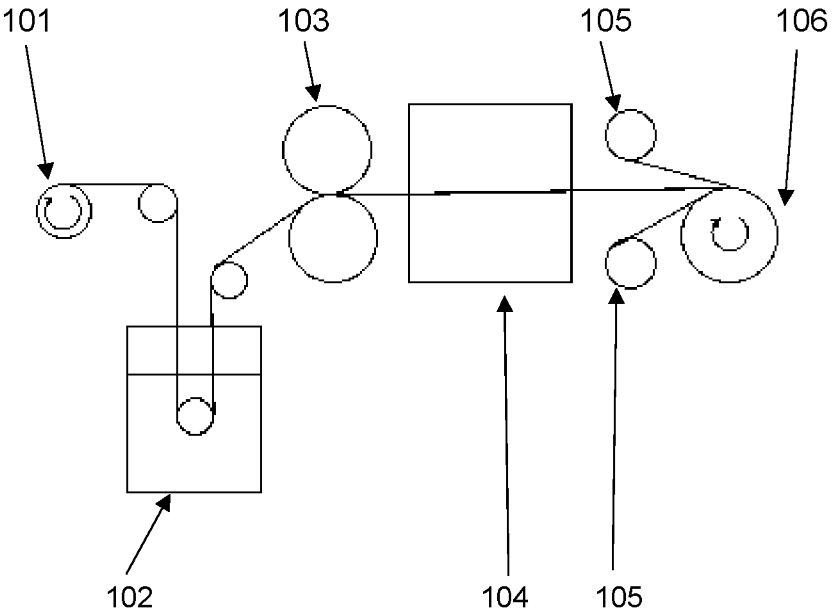
FIG. 1 illustrates a process flow of a two-dimensional prepreg using a liquid matrix process. A fabric on a fabric roll (101) passes through a resin bath (102) before passing between nip rollers (103) followed by treatment in a staging oven (104). Release film (105) may then be applied to the prepreg that is wound upon on a roll (106).

The terms "comprising" and "comprises" in this disclosure can mean "including" and "includes" or can have the meaning commonly given to the term "comprising" or "comprises" in U.S. patent Law. Terms "consisting essentially of" or "consists essentially of" if used in the claims have the meaning ascribed to them in U.S. Patent Law. Other aspects of the invention are described in or are obvious from (and within the ambit of the invention) the following disclosure.

A "carbon-carbon composite" as used in this disclosure refers to a carbon fiber-reinforced carbon matrix composite. A carbon-carbon composite is a two-phase composite material where both phases, the matrix and the reinforcement, are carbon. In certain embodiments, a de minimis amount, such as parts per million, of one or more non-carbon elements may also be present.

The term "prepreg" as used in this disclosure means a fibrous material pre-impregnated with a matrix material, such as a synthetic resin. A prepreg is typically used for further manufacturing into a final product.

The instant invention concerns a novel method for fabricating three-dimensional carbon-carbon composites. The invention concerns a method to densify geometrically complex three-dimensional carbon fiber preforms into high density carbon-carbon composites at faster rates and lower cost than traditional processing approaches such as PIP and CVI. In certain embodiments, the instant invention uses multiple resin transfer moldings (RTM) of a three-dimensional preform, or of a partially dense carbon-carbon intermediate, in a closed tool, or fixed, volume using high-pressure piston injectors to produce a carbon-carbon composite.

A number of advancements and technical advantages are achieved through the instant invention. For example, three-dimensional carbon-carbon composites are unique materials that can be used in many high-temperature applications, such as race car brakes, aircraft brakes, and aerospace applications due to their ability to withstand high heat and high mechanical loads. Before the instant invention, disadvantages of using carbon-carbon composites included (i) relatively high composite component cost, which is a function of a long and expensive fabrication process, (ii) significant processing equipment and capital equipment costs, and (iii) composite component size and geometrical complexity limitations due to the size limitations of the specialized processing equipment. These disadvantages, at a minimum, are overcome with the instant invention.

Advantages of the instant invention include the ability to produce high density carbon-carbon composites at a significantly reduced cost compared to conventional fabrication processes. The three-dimensional densification process of the instant invention enables the manufacture of structurally complex three-dimensional carbon-carbon composites without the use of very expensive fabrication equipment or requiring intermediate machining steps to achieve high density, while at the same time maintaining high geometric tolerances in the carbon-carbon composite produced.

Figure 4:
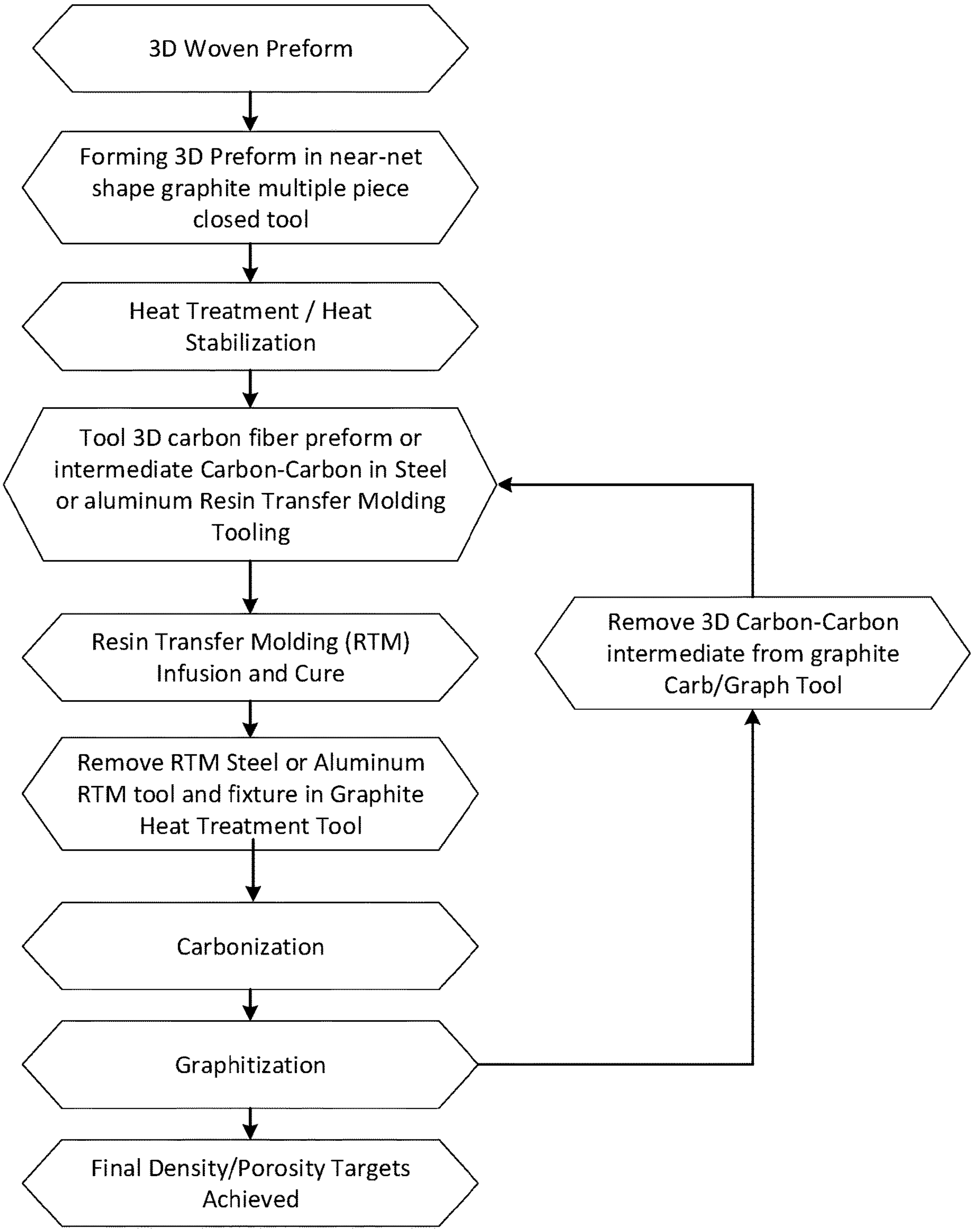
FIG. 4 illustrates a carbon-carbon composite fabrication process of the instant invention.

The invention provides a method of making a carbon-carbon composite. FIG. 4 depicts a flow chart illustrating a carbon-carbon composite fabrication process of the instant invention.

In certain embodiments, a woven three-dimensional carbon fiber preform is impregnated with a high char yield resin. In some embodiments, the woven three-dimensional carbon fiber preform is a flat panel or a complex shape. The high char yield resin is cured to create a three-dimensional polymer matrix composite. The three-dimensional polymer matrix composite is then carbonized, thereby creating an intermediate carbon-carbon composite. The intermediate carbon-carbon composite is then graphitized. In some embodiments, following graphitization, the intermediate carbon-carbon composite is impregnated with a high char yield resin and the high char yield resin is cured. This intermediate carbon-carbon composite that has been resin-impregnated and cured is then further carbonized and graphitized. This process of impregnating with a high char yield resin, carbonizing, and graphitizing the intermediate carbon-carbon composite can be repeated until a final desired carbon-carbon composite density is achieved.

In some embodiments, the invention includes heat treatment and stabilization of a woven three-dimensional carbon fiber preform prior to impregnation with resin. For example, in certain embodiments, a woven three-dimensional carbon fiber preform that is a flat panel or complex shape is placed into a graphite tool and heat treated at a high temperature in the graphite tool to stabilize the preform and remove impurities. In certain embodiments, the heat treatment is conducted in a graphitizing furnace in a temperature range of 4000° F. to 5500° F. In further embodiments, the heat treatment occurs in a partial vacuum or argon atmosphere.

Generally, the graphite tool holds the preform in the formed shape during a high heat treatment step (heat stabilizing the three-dimensional preform to burn off impurities, stabilize the carbon fiber, etc.). Although the graphite tool is similar to a mold, unlike as is typical when using a mold, there is no infusion of resin/matrix. Rather, a role of the graphite tool in the instant invention is to maintain dimensional stability of the three-dimensional preform, that is, to prevent the three-dimensional preform from distorting under its own weight or distorting due to residual stresses in the preform.

The graphite tool can be male- or female-shaped, have sections of each, or comprise multiple segments or inserts, such as one or more mandrel IMLs (inner mold lines), mandrel cores, sidewall OMLs (outer mold lines), driver OMLs (outer mold lines), or endcaps.

One aspect of the instant invention is that the graphite tool typically has or mirrors the ultimate shape desired for the carbon-carbon composite. For example, if an airplane skin shape is the ultimate shape desired for the final carbon-carbon composite product, the graphite tool will be in the shape of the airplane skin. Similarly, if an airplane brake is the ultimately desired shape for the carbon-carbon composite, then the graphite tool will be in the shape of the airplane brake. Likewise, if the carbon fiber preform being processed is to be a flat panel, a graphite tool that is, e.g., a plate, may be used in this embodiment to ensure that the panel is truly flat, as without a plate stock the panel may or may not warp.

In further embodiments, after heating the graphite tool and preform, the woven three-dimensional carbon fiber preform is then placed into a resin transfer molding (RTM) tool for impregnation and curing with a high char yield resin.

The RTM tool used is typically substantially the same shape as the graphite tool, which in turn generally has or mirrors the ultimate shape of the three-dimensional carbon-carbon composite being produced. In certain embodiments, the dimensions of the graphite and RTM tools may vary slightly to account for thermal expansion based on differing thermal profiles for each tool.

In some embodiments, the RTM tool comprises multiple segments or inserts. In certain embodiments, the RTM tool comprises male or female segments or has multiple sections of each. The RTM tool may be made of any suitable material, such as, for example, steel or aluminum, or elements of both. In yet other embodiments, the surface of the inner tool cavity of the RTM tool is coated with, e.g., a release film. In some embodiments, the inner cavity of the RTM tool is coated with a release film between 0.001 inches to 0.010 inches thick. In further embodiments, the release film may be a release film rated for a 500° F. operating temperature with a peel strength of 22 Newtons/5 cm for demolding the composite. Examples of suitable release films include compositions comprising paraffin wax films, fluoropolymers, silicones, and combinations thereof.

In certain embodiments, the RTM tool with the woven three-dimensional carbon fiber preform secured therein is placed into a hydraulic press and is operably connected to a hydraulic piston injector. In some embodiments, the surface area of an upper and lower RTM tool dimensionally fit the platens of the press. Generally, the tool does not extend beyond the platens, e.g., in any direction. In further embodiments, the hydraulic press is capable of between 50 and 1000 tons of pressure and a maximum temperature of 850° F.

In embodiments of the instant invention, the piston injector injects a heated high char yield resin into the RTM tool, and the preform is filled with the resin, which is subsequently cured. Upon completion of resin curing, a three-dimensional polymer matrix composite is created.

A suitable resin will typically have an 800° C. thermogravimetric analysis (TGA) char yield between 50%-75%. Examples of suitable resins for impregnating a preform according to the invention include phenolic resins, cyanate ester resins, phthalonitrile resins, benzoxazine resins, and any other high char yield resin. For example, a typical phenolic resin has char yields in the 55-60% range by weight. Prior to injection into the RTM tool, the high char yield resin is typically heated up to a point where the high char yield resin viscosity is between about 50 cps and 2000 cps at temperatures between about 200° F. and 350° F. A person of ordinary skill in the art would appreciate that different high char yield resins may have different temperature points to achieve a suitable viscosity, e.g., a viscosity between 50 cps and 2000 cps.

The high char yield resin viscosity, among other attributes, is typically an important characteristic in making a carbon-carbon composite of the inventive method, and a high char yield resin viscosity between 50 cps and 2000 cps is generally desirable. In certain embodiments, the high char yield resin viscosity is between about 50 cps and 1000 cps.

In certain embodiments, the hydraulic piston injector is capable of exerting pressures of 0 psi to 1000 psi and temperatures up to 700° F. In some embodiments, the hydraulic piston injector is activated when a pressure between 250 psi and 750 psi is exerted.

In certain embodiments, after curing is complete, the injection pressure is relieved and the RTM tool is cooled, e.g., to between 150° F. and 200° F. Depending on the high char yield resin selected, a free-standing (no tooling) post-cure, namely, curing at an ambient temperature outside the RTM tool, may be required to fully crosslink the high char yield resin.

To convert the three-dimensional polymer matrix to a carbon-carbon composite, in certain embodiments, the three-dimensional polymer matrix is reloaded into the graphite tool discussed above, and the graphite tool is then loaded into a carbonization furnace in which the three-dimensional polymer matrix undergoes carbonization. In some embodiments, this furnace is capable of temperatures between 800° C. and 1200° C. and has an inert gas atmosphere. In certain embodiments, the inert gas atmosphere is nitrogen or argon. Upon carbonization, the three-dimensional polymer matrix becomes a three-dimensional intermediate carbon-carbon composite.

In further embodiments, the three-dimensional intermediate carbon-carbon composite undergoes graphitization. For example, in certain embodiments, after carbonization, the graphite tool containing the three-dimensional carbon-carbon composite is loaded into a graphitizing furnace in which the three-dimensional carbon-carbon composite undergoes graphitization. In some embodiments, this furnace is capable of ultimate temperatures between 1500° C. and 2500° C. and has a negative pressure atmosphere. In certain embodiments, the ultimate temperature achieved is at minimum 2100° C.

In some embodiments, after graphitization, the three-dimensional intermediate carbon-carbon composite is reloaded into the resin transfer molding tool discussed above, and the steps of resin impregnation, composite carbonization, and graphitization are repeated until a final desired density for the carbon-carbon composite is achieved.

In some embodiments, when the intermediate carbon-carbon composite is reloaded into the resin transfer molding tool, the resin transfer molding tool does not have the release film of 0.001 inches to 0.010 inches discussed above for resin impregnation of the woven three-dimensional carbon fiber preform. Instead, in certain embodiments, the inner cavity of the RTM tool comprises an organic liquid release coating that coats the interior surfaces of the tool cavity. Examples of suitable organic liquid release coatings include liquid paraffin wax, sacrificial hydrocarbon solvents, liquid fluoropolymer release agents, and any combination thereof. It is expected that the organic liquid release coating serves the same purpose as the release film above, but in particular, facilitates the ability of the intermediate carbon-carbon composite to de-bond from the RTM tool mold cavity. Because the liquid release coating takes up less volume than a release film (e.g., a film that is 0.001-inches 0.010 inches thick), use of a liquid release coating generally better ensures that the volume is maintained such that the intermediate carbon-carbon composite can fit into the tool at this stage.

The intermediate carbon-carbon composite secured in the RTM tool is then loaded into a hydraulic press, such as that discussed above. As above, the surface area of the upper and lower RTM tool typically dimensionally fit the platens of the press, and the press is capable of between 50 and 1000 tons of pressure and a temperature maximum of 850° F. In further embodiments, a piston injector for injecting a high char yield resin is operably connected to the hydraulic press and is capable of exerting pressures of 0 psi to 1000 psi and temperatures up to 700° F.

Similar to above, a heated high char yield resin is injected into the inner cavity of the RTM tool that comprises the intermediate carbon-carbon composite secured therein. The high char yield resin typically has an 800° C. thermogravimetric analysis (TGA) char yield between 50%-75%. Examples of suitable resins for impregnating an intermediate carbon-carbon composite according to the invention include phenolic resins, cyanate ester resins, phthalonitrile resins, benzoxazine resins, and any other high char yield resin.

In some embodiments, the resin is heated up to a point where the resin viscosity is between 50 cps and 2000 cps at temperatures between 200° F. and 350° F. In certain embodiments, the hydraulic piston injector can then be activated, e.g., when a pressure between 250 psi and 750 psi is exerted. The piston injector injects the heated high char yield resin into the inner cavity of the RTM tool that contains the intermediate carbon-carbon composite. In this embodiment, the residual porosity of the intermediate carbon-carbon composite is filled with resin.

After curing the resin, in certain embodiments, the RTM tool is cooled to between 150° F. and 200° F. In some embodiments, depending on the resin used, a free-standing post-cure may be required to fully crosslink the resin.

In some embodiments, after resin impregnation and curing of the intermediate carbon-carbon composite, the intermediate carbon-carbon composite is reloaded into the graphite tool used above for carbonizing the three-dimensional polymeric matrix composite. The intermediate carbon-carbon composite in the graphite tool is then loaded into a carbonizing furnace. In some embodiments, the carbonizing furnace is capable of temperatures between 800° C. and 1200° C. and has an inert gas atmosphere. In certain embodiments, the inert gas atmosphere is nitrogen or argon.

In further embodiments, after carbonization, the intermediate carbon-carbon composite in the graphite tool is reloaded into the graphitizing furnace. In some embodiments, the graphitizing furnace is capable of temperatures between 1500° C. and 2500° C. and has a negative pressure atmosphere. In certain embodiments, the ultimate temperature achieved is at minimum 2100° C.

In some embodiments, the carbon densification cycle for the intermediate carbon-carbon composite (resin impregnation, carbonization, and graphitization) is repeated one to four times to achieve a desired carbon-carbon composite final density target. In other embodiments, the carbon densification cycle for the intermediate carbon-carbon composite is repeated more than one to four times to achieve a final density target. In some embodiments, the density target is between 1.5 gm/cc to 2.0 gm/cc. In further embodiments, the density target is between 1.7 gm/cc to 2.0 gm/cc. In certain embodiments, the density target is greater than 2.0 gm/cc.

A person of ordinary skill in the art would appreciate that the repeated resin transfer molding steps introduce additional carbon into the composite while the carbonization steps (e.g., a chemical change) create more pure carbon char in the intermediate carbon-carbon composite, and the graphitization steps (e.g., structural change) create a more ordered, and thus more graphitic, carbon in the intermediate carbon-carbon composite. These various steps add more carbon matrix to the composite and thus decrease the composite's porosity and correspondingly increase the composite's density.

In some embodiments, variations are applied between repeat RTM, carbonization, and/or graphitization steps for the intermediate carbon-carbon composite. For example, in certain embodiments, less resin may be added in a second RTM infusion than in a first RTM infusion, and similarly, less resin added in a third RTM infusion than the second infusion, e.g., less resin being required as a result of the open volume in the intermediate carbon-carbon composite filling up after carbonization and graphitization (e.g., resin char) conversion. In certain embodiments, variations during repeated cycles may include variations in, e.g., temperature and/or time for resin infusion and curing; ramp rates, ultimate temperature, and dwell times for carbonizing run profiles; and/or ramp rates, ultimate temperature, and dwell times for graphitizing run profiles. In some embodiments, one or more different resins are used in one or more RTM cycles, e.g., a lower viscosity resin can be used in a second or third RTM cycle than used in a first or earlier RTM cycle to better infiltrate the micro-porosity of the intermediate carbon-carbon composite.

When the final density targets are achieved, the carbon-carbon composite is no longer considered an intermediate carbon-carbon composite, and is considered a three-dimensional carbon-carbon composite suitable for use in a desired application, such as a component in an aeronautical product, aerospace product, and/or automotive product.

The instant invention further relates to a high-density carbon-carbon composite. The instant invention provides, in some embodiments, a carbon-carbon composite comprising a three-dimensional woven carbon fiber preform impregnated with a polymer matrix material and forming a three-dimensional polymer matrix composite, wherein the three-dimensional polymer matrix composite is carbonized and graphitized. In certain embodiments, a carbon-carbon composite of the invention is produced according to a method of the invention as described herein.

Figure 2:
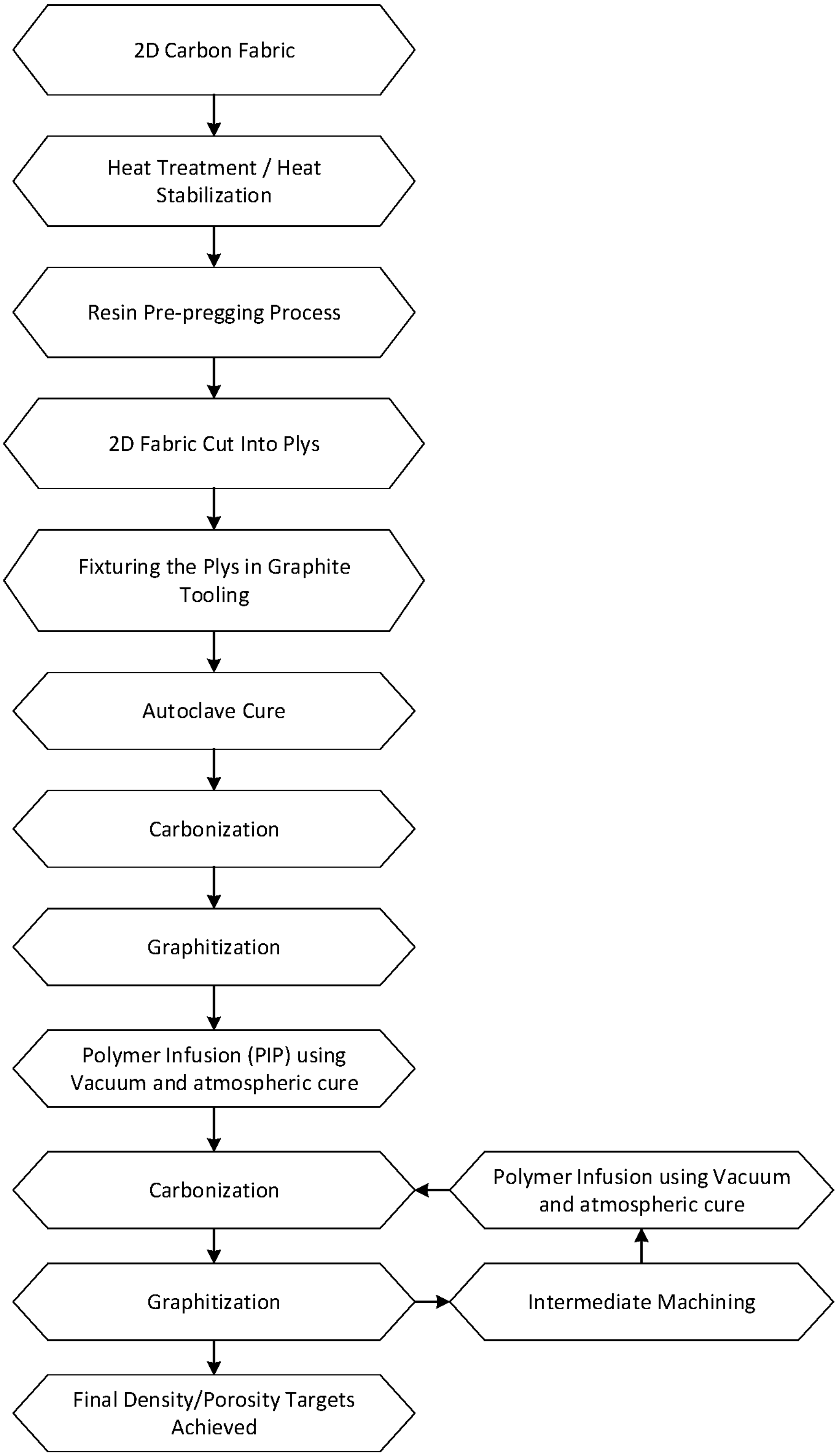
FIG. 2 is a flow chart depicting a carbon-carbon composite fabrication process from a two-dimensional prepreg using a liquid matrix process.

The three-dimensional carbon-carbon composites produced according to the instant inventive process hold a number of advantages over those produced by the conventional two-dimensional prepreg liquid matrix approach. FIG. 1 illustrates a process flow of a two-dimensional prepreg using a liquid matrix process, and FIG. 2 provides a flow chart depicting a carbon-carbon composite fabrication process from a two-dimensional prepreg using a liquid matrix process. Advantages of the instant invention over the conventional two-dimensional prepreg liquid matrix approach include, e.g., higher performance in interlaminar-dependent applications. For example, in the traditional two-dimensional prepreg process, three-dimensional carbon preforms are not prepregged as the resin does not infiltrate into the preform well and the rollers or nips could damage the three-dimensional architecture. Traditional two-dimensional composites do not have through-thickness reinforcement, and thus have lower interlaminar properties. Accordingly, three-dimensional carbon-carbon composites have significantly higher performance in interlaminar dependent applications.

An additional advantage of the instant inventive process is that in traditional two-dimensional prepreg processes, a complex shape can be very difficult and time consuming to fabricate. Ply packages can become very complex and require a significant amount of labor to lay up. Moreover, significant quality control is needed to ensure part to part consistency with complex two-dimensional composites. Geometrically complex two-dimensional carbon-carbon composites would be a challenging process to industrialize for mass production. In contrast, three-dimensional fiber preforms can be machine woven on a large scale and formed into complex shapes on an industrial scale.

Unlike traditional two-dimensional carbon-carbon composite approaches, no intermediate machining step is required with the process of the instant invention. With conventional two-dimensional carbon-carbon composite approaches, usually there is at least one intermediate machining step to allow the resin to infiltrate into the center of the composite. This machining step can be costly and time consuming, especially for geometrically complex shapes. Embodiments of the instant invention require no intermediate carbon-carbon composite machining.

In some embodiments, a near net shape, or near final dimensions, is obtained via use of the graphite tool according to the instant invention. The inventive process described herein, among other things, results in a technical advantage in that a person of ordinary skill in the art can avoid machining the "acreage" of the three-dimensional carbon-carbon composite ultimately produced. That is, the ability to manufacture three-dimensional carbon-carbon composites to high tolerances without acreage machining (generally understood as removing a large amount of material to arrive at a resultant shape, e.g., molding a cube of material and machining a large portion to arrive at a sphere shape) may be achieved by the methods of the instant invention. For large acreage areas, for example, when measuring feet by feet or 12-inch square or greater, of a carbon-carbon composite of the invention, the inventive process typically results in a product where no machining of the large acreage area is required. One example of a large acreage area that may not require machining according to the instant invention is a carbon-carbon composite product that is a fan blade. The acreage area of the fan blade can be formed according to the process of the instant invention without machining. At the same time, in certain embodiments, some machining of a carbon-carbon composite produced according to the methods of the instant invention may be employed, for example, for features that may not be readily woven or threaded bolt holes. Another example where some machining of a carbon-carbon composite product of the invention may be desired in certain embodiments may be the root area of a fan blade.

Figure 3:
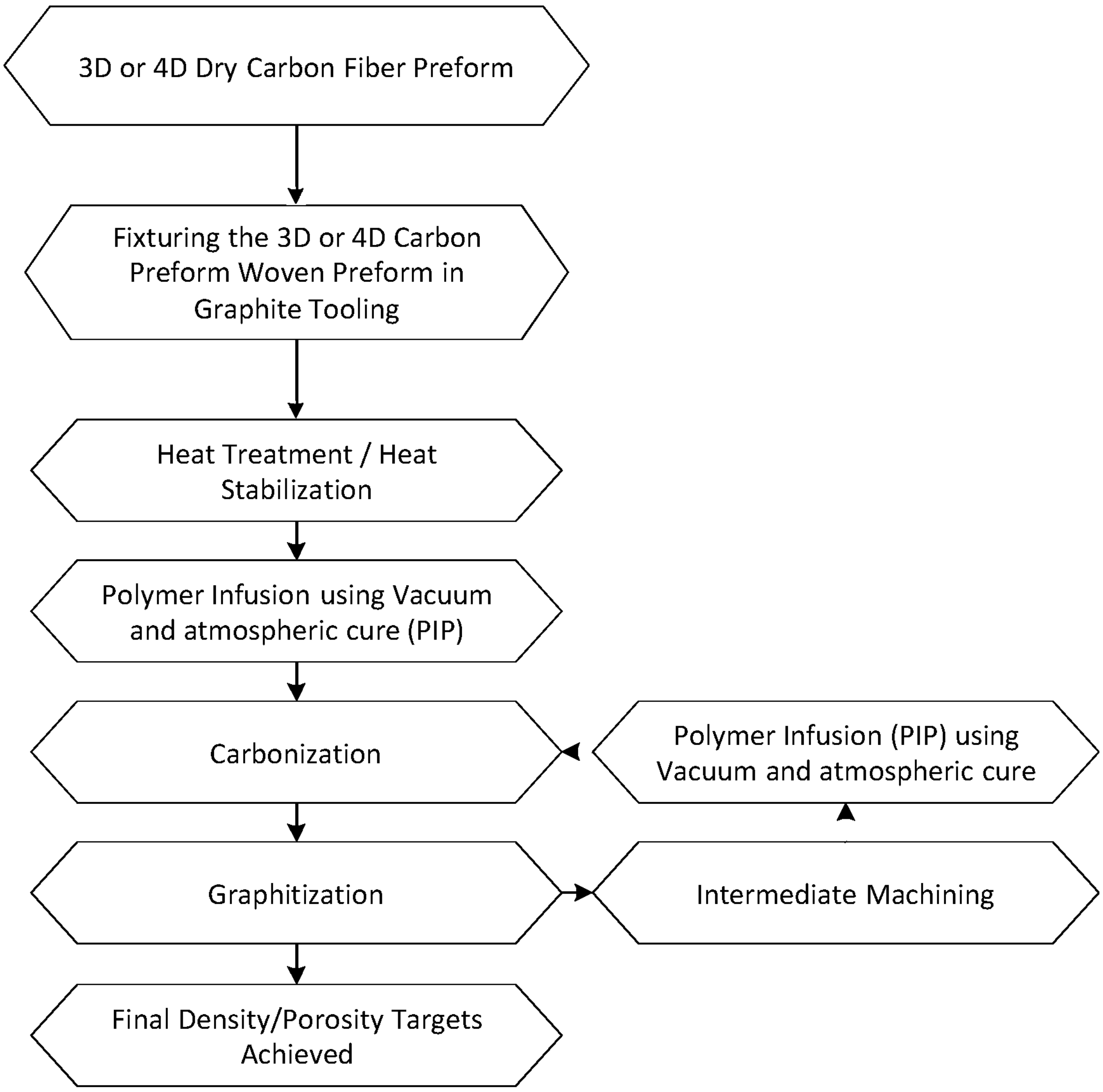
FIG. 3 is a flow chart depicting a carbon-carbon composite fabrication process from a three-dimensional or four-dimensional woven fiber preform using a polymer infiltration and pyrolysis (PIP) process.

Furthermore, the methods and three-dimensional carbon-carbon composites of the instant invention have several advantages over the PIP traditional process. FIG. 3 provides a flow chart depicting a carbon-carbon composite fabrication process from a three-dimensional or four-dimensional woven fiber preform using a polymer infiltration and pyrolysis (PIP) process. In contrast to the PIP process, the process of the instant invention produces a higher density part with fewer processing steps. The process of the instant invention achieves a higher density with less processing cycles than vacuum or atmospheric PIP infiltration. With multiple vacuum or atmospheric PIP cycles, the outside of the composite densifies quickly, thereby trapping off the porosity in the inner regions of the composite. Skim machining steps are needed to remove the outer high-density regions to allow the polymer to infiltrate back into the center of the part. With the instant inventive processes and three-dimensional carbon-carbon composites, there is no need for, e.g., skim machining steps, because the disadvantages of the outside of the composite densifying quickly does not occur as it does with the PIP process.

Additionally, in certain embodiments, the three-dimensional carbon-carbon composite production process of the instant invention applies a high pressure for maximum resin gains and the ability to maintain dimensional tolerances unlike the traditional PIP process. For example, the instant invention, in some embodiments, uses a resin injector capable of multiple hundreds of pounds per square inch (psi) of pressure to drive the resin into the composite's porosity and hold the resin there for the gel/cure step. The use of a hydraulic press in embodiments of the invention to hold the molding tool and thus better ensure the composite's dimensional tolerances leads to multiple technical advantages over conventional processes such as PIP. For example, the use of a hydraulic press in embodiments of the instant invention achieves a higher resin pickup than atmospheric infiltration, thereby resulting in fewer RTM cycles needed than atmospheric cycles to achieve the same density gains. Moreover, atmospheric processing can also require intermediate skim machining steps that RTM processing does not require. And the hydraulic press and RTM tool supports better ensure the composite's dimensional tolerances, thus removing a need for additional intermediate machining steps and quality control steps. Additionally, less processing waste is produced in the methods of the invention compared to the traditional PIP process. For example, when using a PIP approach, depending on the number of machining steps and the geometric complexity of the carbon-carbon composite, a fair amount of the carbon-carbon composite can be machined away and become process waste.

The process of the instant invention for producing three-dimensional carbon-carbon composites also has advantages over the traditional process of CVI. For example, embodiments of the instant invention have a significantly lower processing time than a dry fabric or prepreg ($1^{st}$ cycle) two-dimensional or three-dimensional CVI process. CVI cycles can take up to a week or more, e.g., 5-15 days, of processing time per cycle in the reactor to achieve a high-density carbon-carbon composite, and often five to ten cycles are needed. In contrast, the inventive process can be 1 day per cycle. Thus, the inventive process provides a significant amount of time savings for the manufacture of high-density carbon-carbon composites.

Moreover, the inventive process has significantly lower capital equipment costs than CVI capital equipment costs. For example, CVI equipment, especially the reactors, are very expensive to operate and maintain. And further, there is limited vendor availability for the CVI process. For example, there are only a few CVI job-shop vendors from which to select and even fewer with large component capacity and the ability to industrialize a process. Additionally, the value of the target application has to be a very high value to justify the initial CVI capital equipment costs and to justify the overall business, such as commercial aircraft brakes.

The three-dimensional preform employed in the methods of the invention and related products is typically a woven three-dimensional carbon fiber preform. In some embodiments, the woven three-dimensional carbon fiber preform is machine (e.g., jacquard) woven. Any suitable type of weave may be employed in forming the woven preform. Examples of suitable weave types include, e.g., plain weave, twill weave, and harness satin weave.

In yet other embodiments, the woven three-dimensional preform is a three-dimensional fiber architecture comprised of ply-to-ply interlock, angle interlock, orthogonal interlock, or any combination of these. See e.g., Boussu, François et al., *Mouldability of Angle Interlock Fabrics*, FPCM-9 (2008), The 9th International Conference on Flow Processes in Composite Materials Montréal (Québec), Canada and Li, Weixin et. al., *Elastic and fracture behavior of three-dimensional ply-to-ply angle interlock woven composites: Through-thickness, size effect, and multiaxial tests*, Composites Part C: Open Access, Volume 4, March 2021, 100098, each incorporated herein by reference, regarding suitable examples of three-dimensional fiber architectures, such as angle interlock, orthogonal interlock, etc.

In certain embodiments, the woven three-dimensional preform comprises one or more carbon fibers that are a fiber type and grade of high strength, intermediate modulus, high modulus carbon fiber, or any combination thereof. In other embodiments, the size of the carbon fiber of the woven three-dimensional preform is 3K, 6K, 12K, 24K, 48K, or any combination of these fiber sizes. Carbon fiber sizes such as these are fibers, or filaments, bundled together in tows that are identified by the number of carbon filaments they contain. The "K" refers to a thousand, so that, for example, a 3K tow is made of 3000 carbon filaments. Thus, for example, a suitable 3K carbon fiber is a 3K tow composed of 3000 carbon filaments; a suitable 6K carbon fiber, for example, is a 6K tow composed of 6000 carbon filaments; and similarly so forth for 12K, 24K, 48K, etc. carbon fiber sizes. See e.g., www(dot)elevatedmaterials(dot)com/carbon-fiber-weaves-what-they-are-and-why-to-use-them/, incorporated herein by reference. In some embodiments, a standard 3K tow is typically 0.125 inches wide.

In some embodiments, the three-dimensional preform has a carbon fiber volume fraction between about 25%-85% or any range in between. In certain embodiments, the carbon fiber volume fraction is between about 30%-75%. In further embodiments, the carbon fiber volume fraction is between about 35%-60%, 40%-65%, or 50%-75%.

EXAMPLE

A three-dimensional carbon fiber preform is processed as either a flat panel or a geometrically complex shape, such as a convex or concave shape. With a geometrically complex shape, the three-dimensional carbon fiber preform is formed and then inserted into a complex-shaped graphite tool.

Once the three-dimensional carbon fiber preform is formed into a graphite tool, the preform and tool are heat treated to a high temperature to stabilize the three-dimensional carbon fiber preform and to remove any volatile impurities. The heat treatment is conducted in a graphitizing furnace in a temperature range of 4000° F. to 5500° F. in a partial vacuum or argon atmosphere.

After the heat treatment is complete (e.g., via a cycle whereby a furnace ramps up at a set rate, holds at maximum temperature for a given time and then cools), the three-dimensional carbon fiber preform is carefully removed from the graphite tool and loaded into a resin transfer molding (RTM) tool. This RTM tool is typically male or female or may be a section of each. The tool may also comprise multiple segments or inserts and be made from steel or aluminum, or elements of both. In effect, the RTM tool used is substantially the same shape as the graphite tool that is used in the preceding step, which in turn generally has or mirrors the ultimate shape of the three-dimensional carbon-carbon composite being produced. In certain embodiments, the dimensions of the graphite and RTM tools may vary slightly to account for thermal expansion based on differing thermal profiles for each tool. The inner diameter surface of the inner tool cavity of the RTM tool is coated with, e.g., a release film between 0.001 inches to 0.010 inches thick that is rated for a 500° F. operating temperature with a peel strength of 22 Newtons/5 cm, for demolding the composite. The tool is then closed shut, e.g., with bolts or other methods such as press compression to ensure a tight seal. For example, an upper tool component may be bolted to an upper press platen and lower tool component bolted to a lower press platen.

Once the RTM tool is closed with the three-dimensional carbon fiber preform inside, the assembly is loaded into a hydraulic press. The surface area of the upper and lower RTM tool dimensionally fit the platens of the press. Generally, the tool does not extend beyond the platens, e.g., in any direction. The hydraulic press is capable of between 50 and 1000 tons of pressure and a maximum temperature of 850° F. One end of a 304 or 316 grade stainless steel line is connected to the RTM tool inlet and the other end is connected to a piston injector, such as a hydraulic piston injector. The injector is capable of exerting pressures of 0 psi to 1000 psi and temperatures up to 700° F.

A high char yield resin (having an 800° C. thermogravimetric analysis (TGA) char yield between 50%-75%) is then added to the piston injector.

The high char yield resin is then heated up to the point that the high char yield resin viscosity is between 50 cps and 2000 cps at temperatures between 200° F. and 350° F.

The hydraulic piston injector is then activated and a pressure between 250 psi and 750 psi is exerted. A line valve is then opened from the hydraulic piston injector and the high char yield resin fills the RTM tool cavity that contains the three-dimensional preform. The preform is filled with resin. A cure cycle is then initiated to cure the resin in the RTM tool under injection pressure.

After the cure is complete, the injection pressure is relieved and the RTM tool is cooled to between 150° F. and 200° F. The RTM tool is removed from the press and opened up. The three-dimensional preform is now a three-dimensional polymer matrix composite (three-dimensional PMC).

After the three-dimensional polymer matrix composite's resin is fully cured, a conversion to a carbon-carbon composite is performed using a carbonizing furnace and a graphitizing furnace. The three-dimensional polymer matrix composite is loaded back into the graphite tool previously described. The graphite tool containing the three-dimensional polymer matrix composite is then loaded into a carbonizing furnace. This furnace is capable of temperatures between 800° C. and 1200° C. and has an inert gas, usually either nitrogen or argon, atmosphere. Upon completion of the carbonization run, the furnace is cooled and the graphite tool with the three-dimensional composite is removed from the furnace. The composite is now considered a three-dimensional intermediate carbon-carbon composite.

The graphite tool containing the three-dimensional intermediate carbon-carbon composite is then loaded into a graphitizing furnace. This furnace is capable of ultimate temperatures between 1500° C. and 2500° C. and has a negative pressure atmosphere. The ultimate temperature achieved is at minimum 2100° C. Upon completion of the graphitization run, the furnace is cooled, and the graphite tool with the three-dimensional intermediate carbon-carbon composite is removed from the furnace. The three-dimensional intermediate carbon-carbon composite is then removed from the graphite tool.

The three-dimensional intermediate carbon-carbon composite is then reloaded into the RTM tool. Unlike the first RTM infusion, the tool does not have the release film or ply of e.g., 0.001 inches to 0.010 inches, but rather an organic liquid release coats the interior surfaces of the tool cavity since a liquid release agent should take up less volume than a release film or ply. The organic liquid release agent serves the same purpose here as a release film, in particular, to facilitate the ability of the carbon-carbon composite to de-bond from the tool mold cavity. But because the liquid release agent takes up less volume than a release film (e.g., a film that is 0.001 inches-0.010 inches thick), use of a liquid release agent generally better ensures that the volume is maintained such that the carbon-carbon composite can fit into the tool at this stage.

The intermediate carbon-carbon composite typically has a density in the range of 1.40 gm/cc to 1.80 gm/cc and is thus relatively soft and can be carefully fit into the geometrically complex shape (or flat panel) of the RTM tool.

Once the RTM tool has been closed (e.g., bolted or compressed shut) with the three-dimensional intermediate carbon-carbon composite inside, the assembly is loaded into a hydraulic press like that described in the preceding steps above. The surface area of the upper and lower RTM tool dimensionally fits the platens of the press, and the press is capable of between 50 and 1000 tons of pressure and a temperature maximum of 850° F. One end of a 304 or 316 grade stainless steel line is then connected to the RTM tool inlet and the other end is connected to a hydraulic piston injector. The injector is capable of exerting pressures of 0 psi to 1000 psi and temperatures up to 700° F.

As in preceding steps, a high char yield resin is then added to the piston injector. Any resin with an 800° C. TGA char yield between 50% and 75% is suitable. The resin is then heated up to the point that the resin viscosity is between 50 cps and 2000 cps at temperatures between 200° F. and 350° F. The hydraulic piston injector is then activated and pressure exerted between 250 psi and 750 psi. A line valve is then opened and the resin fills the RTM tool cavity that contains the three-dimensional intermediate carbon-carbon composite. The residual porosity of the intermediate carbon-carbon composite is filled with resin. A cure cycle is then initiated to cure the resin in the RTM tool under injection pressure.

After the cure is complete, the injection pressure is relieved, and the RTM tool is cooled to between 150° F. and 200° F. The RTM tool is removed from the press and opened up. The three-dimensional intermediate carbon-carbon composite is removed from the tool.

After the three-dimensional intermediate carbon-carbon composite's resin is fully cured, a further conversion to carbon-carbon is performed using a carbonizing furnace and a graphitizing furnace, similar to the process described above. That is, the three-dimensional intermediate carbon-carbon composite is loaded back into the graphite heat treatment tool. The graphite tool containing the three-dimensional intermediate carbon-carbon composite is then loaded into a carbonizing furnace. This furnace is capable of temperatures between 800° C. and 1200° C. and has an inert gas, usually either nitrogen or argon, atmosphere. Upon completion of the carbonization run, the furnace is cooled and the graphite tool with the three-dimensional intermediate carbon-carbon composite is removed from the furnace.

The graphite tool containing the three-dimensional intermediate carbon-carbon composite is then loaded into a graphitizing furnace. This furnace is capable of temperatures between 1500° C. and 2500° C. and has a negative pressure atmosphere. The ultimate temperature achieved is at minimum 2100° C. Upon completion of the graphitization run, the furnace is cooled and the graphite tool with the three-dimensional intermediate carbon-carbon composite is removed from the furnace. The three-dimensional intermediate carbon-carbon composite is then removed from the graphite tool.

This cycling, namely, the resin-transfer molding step of the intermediate carbon-carbon composite (discussed above) followed by the carbonization and graphitization steps for the intermediate carbon-carbon composite, is repeated another one to four times to achieve the desired carbon-carbon composite final density targets, such as a target between 1.70 gm/cc to 2.0 gm/cc.

In some embodiments, variations are applied between repeat RTM, carbonization, and/or graphitization steps for the intermediate carbon-carbon composite. For example, in certain embodiments, less resin may be added in a second RTM infusion than in a first RTM infusion, and similarly, less resin added in a third RTM infusion than the second infusion, e.g., less resin being required as a result of the open volume in the intermediate carbon-carbon composite filling up after carbonization and graphitization (e.g., resin char) conversion. In certain embodiments, variations during repeated cycles may include variations in, e.g., temperature and/or time for resin infusion and curing; ramp rates, ultimate temperature, and dwell times for carbonizing run profiles; and/or ramp rates, ultimate temperature, and dwell times for graphitizing run profiles. In some embodiments, one or more different resins are used in one or more RTM cycles, e.g., a lower viscosity resin can be used in a second or third RTM cycle than used in a first or earlier RTM cycle to better infiltrate the micro-porosity of the intermediate carbon-carbon composite.

When the final density targets are achieved, the carbon-carbon composite is no longer considered an intermediate carbon-carbon composite, and is considered a three-dimensional carbon-carbon composite suitable for use in a desired application, such as a component in an aeronautical product, aerospace product, and/or automotive product.

Modifications to the above would be obvious to those of ordinary skill in the art, but would not bring the invention so modified beyond the scope of the present invention. The claims to follow should be construed to cover such situations.

The invention claimed is:

1. A method of making a carbon-carbon composite, comprising:

(a) impregnating a woven three-dimensional carbon fiber preform with a high char yield resin, wherein the high char yield resin has an 800° C. thermogravimetric analysis (TGA) char yield between 50-75%;

(b) curing the high char yield resin, thereby creating a three-dimensional polymer matrix composite;

(c) carbonizing the three-dimensional polymer matrix composite, thereby creating an intermediate carbon-carbon composite;

(d) graphitizing the intermediate carbon-carbon composite;

(e) impregnating the intermediate carbon-carbon composite with the high char yield resin and curing the high char yield resin;

(f) carbonizing the intermediate carbon-carbon composite of (e); and (g) graphitizing the intermediate carbon-carbon composite of (f), wherein the carbonization and graphitization of (c), (d), (f), and (g) occur in a graphite tool.

2. The method of claim 1, further comprising:

(h) repeating (e)-(g) until a carbon-carbon composite final density target is achieved.

3. The method of claim 1, wherein the woven three-dimensional carbon fiber preform is heat treated and stabilized prior to resin impregnation in (a).

4. The method of claim 1, wherein the woven three-dimensional carbon fiber preform is heat treated and stabilized in the graphite tool.

5. The method of claim 4, wherein the graphite tool and woven three-dimensional carbon fiber preform are heated to 4000-5000° F. in a partial vacuum or inert atmosphere.

6. The method of claim 1, wherein the woven three-dimensional carbon fiber preform comprises a fiber type selected from the group consisting of: high strength carbon fibers, intermediate modulus carbon fibers, high modulus carbon fibers, and combinations thereof and/or the woven three-dimensional carbon fiber preform comprises a carbon fiber size selected from the group consisting of: 3K, 6K, 12K, 24K, and 48K.

7. The method of claim 1, wherein the woven three-dimensional carbon fiber preform is jacquard woven and/or comprises a three-dimensional fiber architecture selected from the group consisting of: ply to ply interlock, angle interlock, orthogonal interlock, and combinations thereof.

8. The method of claim 1, wherein the woven three-dimensional carbon fiber preform comprises a carbon fiber volume fraction between 50%-75%.

9. The method of claim 4, wherein the graphite tool comprises a shape selected from the group consisting of: a male section, a female section, a male and female section, a segment, an insert, and combinations thereof.

10. The method of claim 1, wherein the woven three-dimensional carbon fiber preform is near net shaped.

11. The method of claim 1, wherein impregnation with the high char yield resin in (a) and (e) occurs in a resin transfer molding tool.

12. The method according to claim 11, wherein the resin transfer molding tool comprises a shape selected from the group consisting of: a male section, a female section, a male and female section, a segment, an insert, and combinations thereof.

13. The method of claim 11, wherein an inner tool cavity of the resin transfer molding tool in (a) is coated with a release film between 0.001 inches to 0.010 inches thick and rated for a 500° F. operating temperature with a peel strength of 22 Newtons/5 cm and/or an inner tool cavity of the resin transfer molding tool in (e) is coated with an organic liquid release coat.

14. The method of claim 11, wherein the resin transfer molding tool is loaded into a hydraulic press.

15. The method of claim 11, wherein a piston injector comprising the high char yield resin is operably connected to a resin inlet port on the resin transfer molding tool.

16. The method of claim 1, wherein the high char yield resin is selected from the group consisting of: phenolic resins, cyanate ester resins, phthalonitrile resins, and benzoxazine resins.

17. The method of claim 1, wherein the high char yield resin is heated such that the resin has a viscosity between 48 cps and 1,000 cps.

18. The method of claim 1, wherein the carbonizing occurs in a carbonizing furnace capable of temperatures between 800° C. and 1200° C. and having an inert gas atmosphere.

19. The method of claim 1, wherein the graphitizing occurs in a graphitizing furnace capable of temperatures between 1500° C. and 2500° C. and having a negative pressure atmosphere.

* * * * *